United States Patent [19]  
Hayashi et al.

[11] Patent Number: 4,748,898  
[45] Date of Patent: Jun. 7, 1988

[54] SWITCHING VALVE DEVICE

[75] Inventors: Tsutomu Hayashi; Mitsuru Saito; Yoshihiro Yoshida, all of Tokyo, Japan

[73] Assignee: Honda Giken Kogyo Kabushiki Kaisha, Tokyo, Japan

[21] Appl. No.: 868,133

[22] Filed: May 28, 1986

[30] Foreign Application Priority Data

May 28, 1985 [JP] Japan .................. 60-115046  
Jul. 15, 1985 [JP] Japan .................. 60-155830

[51] Int. Cl.$^4$ ............................................. F01B 3/00  
[52] U.S. Cl. ...................................... 92/12.2; 60/487; 91/437; 188/300  
[58] Field of Search ................. 91/461, 437, 438, 506; 60/487, 488, 489, 490, 468, 494; 137/636; 188/300; 267/64.12; 92/12.2

[56] References Cited

U.S. PATENT DOCUMENTS

| | | | |
|---|---|---|---|
| Re. 24,317 | 5/1957 | Schott | 60/53 |
| 2,388,462 | 11/1945 | Beeh | 103/173 |
| 2,395,980 | 3/1946 | Wahlmark | 91/506 X |
| 2,651,386 | 9/1953 | Rossell | 188/300 X |
| 2,662,375 | 12/1953 | Postel | 60/53 |
| 2,683,421 | 7/1954 | Woydt | 103/161 |
| 2,844,002 | 7/1958 | Pavesi | 60/53 |
| 2,907,230 | 10/1959 | Kollmann | 74/687 |
| 2,984,070 | 5/1961 | Bauer | 60/53 |
| 3,036,434 | 5/1962 | Mark | 60/53 |
| 3,054,263 | 9/1962 | Budzich et al. | 60/490 X |
| 3,131,539 | 5/1964 | Creighton | 60/53 |
| 3,133,418 | 5/1964 | Froebe | 60/53 |
| 3,143,858 | 8/1964 | Roeske | 60/53 |
| 3,165,892 | 1/1965 | Roberts | 60/53 |
| 3,170,297 | 2/1965 | Larson | 60/53 |
| 3,175,363 | 3/1965 | Molly | 60/53 |
| 3,187,868 | 6/1965 | Gantzer | 192/101 |
| 3,213,619 | 10/1965 | Creighton | 60/53 |
| 3,274,947 | 9/1966 | Jonkers | 103/162 |
| 3,313,108 | 4/1967 | Allgaier | 60/53 |
| 3,382,813 | 5/1968 | Schauer | 103/162 |
| 3,416,312 | 12/1968 | Margolin | 60/53 |
| 3,543,514 | 12/1970 | Reimer | 60/53 |
| 3,620,130 | 11/1971 | Roberts | 91/506 |
| 3,698,189 | 10/1972 | Reimer | 60/489 |
| 3,834,164 | 9/1974 | Ritter | 60/492 |
| 4,080,992 | 3/1978 | Niederer | 137/636 |
| 4,170,279 | 10/1979 | Pelletier | 91/437 X |

FOREIGN PATENT DOCUMENTS

| | | |
|---|---|---|
| 23390 | 8/1936 | Australia . |
| 143400 | 5/1950 | Australia . |
| 231526 | 4/1959 | Australia . |
| 268529 | 11/1963 | Australia . |
| 143921 | 12/1935 | Austria . |
| 240661 | 6/1965 | Austria . |
| 317649 | 12/1919 | Fed. Rep. of Germany . |
| 880989 | 7/1949 | Fed. Rep. of Germany . |
| 1200135 | 9/1965 | Fed. Rep. of Germany . |
| 1480553 | 6/1969 | Fed. Rep. of Germany . |
| 1500480 | 7/1969 | Fed. Rep. of Germany . |
| 1625039 | 5/1970 | Fed. Rep. of Germany . |
| 3139191 | 4/1983 | Fed. Rep. of Germany . |
| 791714 | 6/1935 | France . |
| 32-7159 | 7/1957 | Japan . |
| 41-3208 | 11/1966 | Japan . |
| 46-11852 | 3/1971 | Japan . |
| 56-143856 | 11/1981 | Japan . |
| 57-70968 | 5/1982 | Japan . |
| 59-38467 | 9/1984 | Japan . |
| 61-153057 | 7/1986 | Japan . |
| 473997 | 5/1969 | Switzerland . |
| 535555 | 4/1941 | United Kingdom . |
| 574991 | 1/1946 | United Kingdom . |
| 835936 | 5/1960 | United Kingdom . |
| 902978 | 8/1962 | United Kingdom . |
| 1021873 | 3/1966 | United Kingdom . |
| 1222200 | 2/1971 | United Kingdom . |
| 1282094 | 7/1972 | United Kingdom . |
| 2104976 | 3/1983 | United Kingdom . |

Primary Examiner—Edward K. Look  
Attorney, Agent, or Firm—Lyon & Lyon

[57] ABSTRACT

A switching valve device provided in an oil passage in which the flow of oil pressure is supposed to occur in both directions, the switching valve device having two check valves provided in the oil passage so as to allow a flow of oil pressure in respective directions opposite to each other, the check valves being biased by means of springs in their respective closing direction, and means is provided for forcibly open the check valves against the bias of the springs. Thereby the switching valve device selectively assumes a first state which allows a flow of oil pressure in one direction, a second state which allows the flow in the other direction, and a third state which does not allow such flow in any direction.

6 Claims, 6 Drawing Sheets

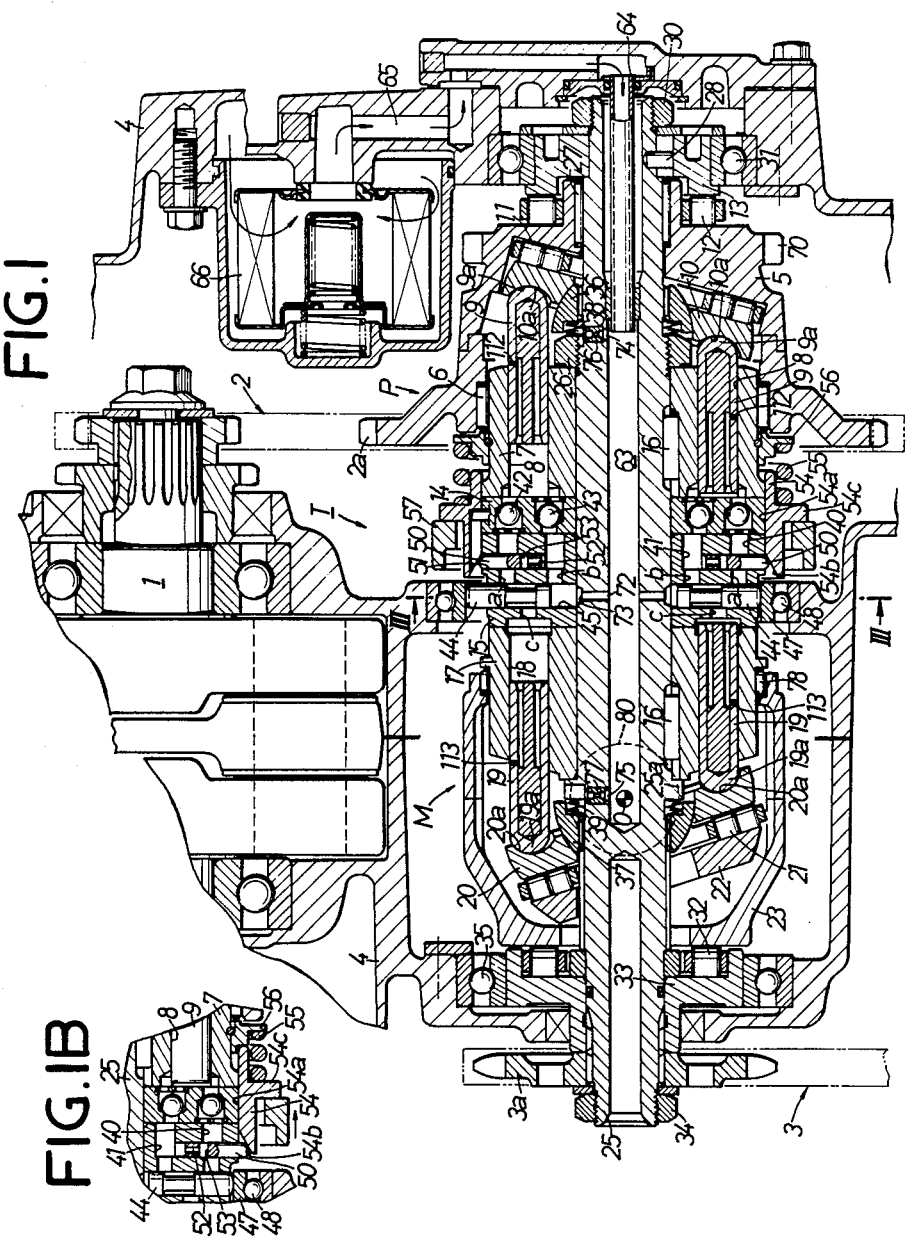

SWITCHING VALVE DEVICE

BACKGROUND OF THE INVENTION

1. Field of the Invention

The present invention relates to a switching valve device, and more particularly to a switching valve device which can selectively obtain at least three states, a state wherein an oil passage provided in a valve casing is cut off only in one direction, a state wherein the oil passage is cut off only in the other direction, and a state wherein the oil passage is cut off in both the directions.

2. Description of the Prior Art

The present assignee has previously proposed (in Japanese Patent Application No. 277,816/84) a switching valve device of the kind as described in which a check valve is provided on a rotary valve body so fitted in a valve casing as to transverse an oil passage in the casing, said rotary body being selectively rotated to three positions, a position wherein the check valve is arranged at a position to cut off the oil passage only in one direction, a position wherein the check valve is arranged at a position to cut off the oil passage only in the other direction, and a position wherein the oil passage is completely cut off.

In the above-proposed switching valve device, since a slight clearance is present between the valve casing and the rotary valve to allow rotation of the valve, it is required to maintain dimensional precision of members at a high level in order to positively obtain a valve closed state, and particularly, when pressure oil is controlled, it is considered that pressure may leak from a high pressure side to a low pressure side through the aforesaid clearance.

SUMMARY OF THE INVENTION

The present invention has been accomplished in view of the above-mentioned circumstances, and it is an object of the invention to provide the aforementioned switching valve device which may positively attain its closed state in the above-described three states.

For achieving the aforesaid object, according to the present invention, there is provided a switching valve device wherein first and second check valves are provided in series in an oil passage formed in a valve casing with forward directions of the valves reversed to each other in the oil passage, these check valves being spring-biased in their respective closing direction, these check valves being provided with valve opening means capable of individually compulsorily opening said valves.

When the first check valve is compulsorily opened by the valve opening means, the oil passage in the valve casing is cut off only in one direction by means of the second check valve; when the second check valve is compulsorily opened, said oil passage is cut off only in the other direction by means of the first check valve; and when both the check valves are set free, said oil passage is cut off in both directions by cooperation of both the check valves. Since elements other than the check valves having an excellent closing function have no valve function, the positive closed state can be obtained under any of the above-described states.

The above and other objects, features and advantages of the present invention will be apparent from the description of preferred embodiments which will be described in detail in connection with the accompanying drawings.

BRIEF DESCRIPTION OF THE DRAWINGS

The drawings show one embodiment of the present invention.

FIG. 1 is a longitudinal sectional view of a static hydraulic pressure type continuously variable transmission incorporated in a power transmission system of a motor-cycle;

FIG. 1B is a view showing the operation of a clutch valve shown in FIG. 1;

DESCRIPTION OF THE PREFERRED EMBODIMENT

Figure 1A:
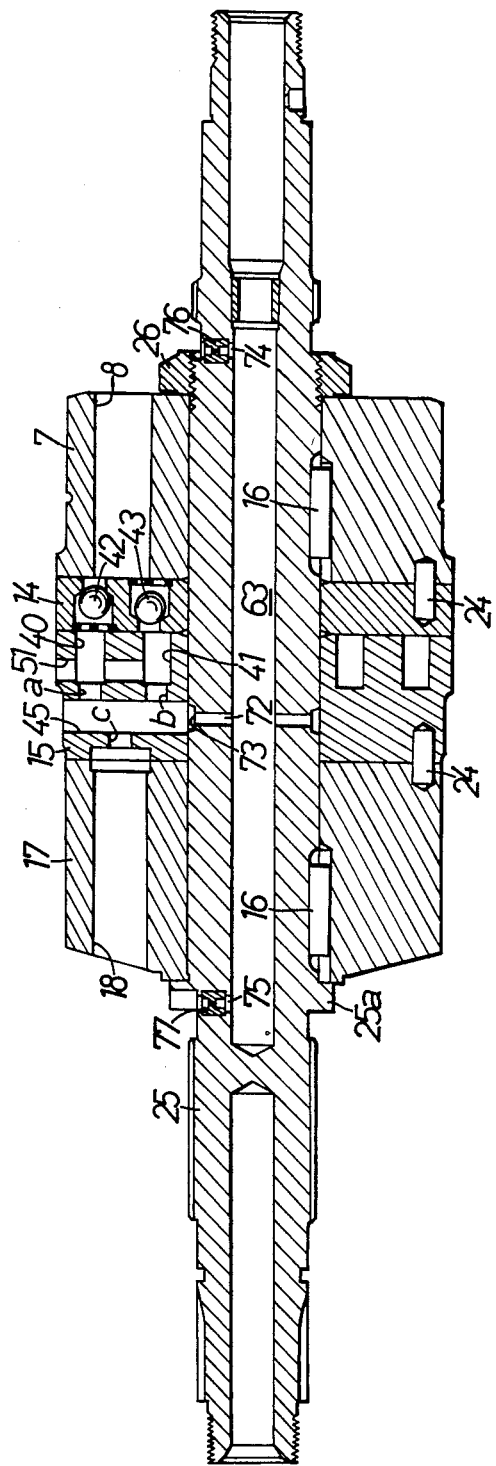
FIG. 1A is a longitudianl sectional view of an assembly comprising a pump cylinder, a motor cylinder, a first and a second valve boards, and an output shaft shown in FIG. 1.

One embodiment of the present invention will be described hereinafter with reference to the drawings. Referring to FIG. 1, power of a motor-cycle engine is successively transmitted from a crank shaft 1 to an unshown rear wheel via a chain type primary reduction gear 2, a static hydraulic pressure type continuously variable transmission T and a chain type secondary reduction gear 3.

The continuously varaible transmission T comprises a swashplate type hydraulic pump P of a constant capacity type and a swashplate type hydraulic motor M of a variable capacity type, which are accommodated within a crank case 4 as a casing which carries a crank shaft 1.

The hydraulic pump P comprises a cup-like input member 5 integrally provided with an output sprocket 2a of the primary reduction gear 2, a pump cylinder 7 relatively rotatably fitted in the inner peripheral wall of the input member 5 through a needle bearing 6, pump plungers 9, 9 slidably fitted in a plurality of and oddnumber of annularly disposed cylinder bores 8, 8 provided in the pump cylinder 7 so as to surround the rotary center thereof, and a pump swashplate 10 in contact with the outer ends of the pump plungers 9, 9.

The back surface of the pump swashplate 10 is rotatably carried on the inner end wall of the input member 5 in an attitude inclined by a predetermined angle with respect to the axis of the pump cylinder 7 through a thrust roller bearing 11 so that when the input member 5 is rotated, the pump plungers 9, 9 are reciprocated to repeatedly effect suction and exhaust strokes.

For improving the followability of the pump plungers 9 relative to the pump swashplate 10, a spring for urging the pump plungers 9 in an elongating direction can be retained in the cylinder bore 8.

The back surface of the input member 5 is supported on a support sleeve 13 through a thrust roller bearing 12.

On the other hand, the hydraulic motor M comprises a motor cylinder 17 arranged coaxially with and to the left of the pump cylinder 7, motor plungers 19, 19 respectively slidably fitted in a plurality and oddnumber of annularly disposed cylinder bores 18, 18 provided in the motor cylinder 17 so as to surround the rotary center thereof, a motor swashplate 20 in contact with the outer ends of the motor plungers 19, 19, a swashplate holder 22 for supporting the back surface and outer peripheral surface of the motor swashplate 20 through a thrust roller bearing 21, and a cup-like swashplate anchor 23 for supporting the swashplate holder 22.

The motor swashplate 20 is tiltingly movable between an upright position at right angles to the axis of the motor cylinder 17 and a position inclined at a certain angle. At the inclined position, the motor plungers 19, 19 are reciprocated upon rotation of the motor cylinder 17 to repeatedly effect expansion and contraction strokes.

For improving the followability of the motor plungers 19 relative to the motor swashplate 20, a spring for urging the motor plungers 19 in an elongating direction can be retained in the cylinder bore 18.

A first and a second valve boards 14, 15 are interposed between the pump cylinder 7 and the motor cylinder 17 in order from the pump cylinder 7 side, and an output shaft 25 extends through the center portions of these elements 7, 14, 15 and 17. These four elements 7, 14, 15 and 17 are superposed and coupled to one another and secured to the output shaft 25 by bringing the outer end of the motor cylinder 17 into abutment with a flange 25a formed integral with the outer periphery of the output shaft 25 and tightening the outer end of the pump cylinder 7 by means of a nut 26 threadedly fitted on the output shaft 25.

At that time, for securing connection of the output shaft 25 with the aforesaid four elements 7, 14, 15 and 17 and regulating the mutual position thereof, keys 16, 16 are mounted between the cylinders 7, 17 and output shaft 25, and knock pins 24, 24 are inserted between the pump cylinder 7 and the first valve board 14 and between the motor cylinder 17 and the second valve board 15, as shown in FIG. 1A.

Turning again to FIG. 1, the output shaft 25 also extends through the input member 5 and rotatably supports the input member 5 through a needle bearing 27.

The support sleeve 13 is fitted over the outer periphery on the right end of the output shaft 25 through a key 28 and secured by means of a nut 30. The right end of the output shaft 25 is rotatably supported on the crank case 4 through the support sleeve 13 and a roller bearing 31.

The aforesaid output shaft 25 extends through the central portion of the motor swashplate 20, the swashplate holder 22 and the swashplate anchor 23, and a support sleeve 33 for supporting the back surface of the swashplate anchor 23 through a thrust roller bearing 32 is spline-fitted to the left end of the shaft 25 and is secured by means of a nut 34 with an input sprocket 3a of the secondary reduction gear 3. The left end of the output shaft 25 is rotatably supported on the crank case 4 through the support sleeve 33 and a roller bearing 35.

Slidably spline-fitted in the output shaft 25 is a semispherical aligning member 36 in engagement with the inner peripheral surface of the pump swashplate 10 in a manner relatively tiltatble in all directions. This aligning member 36 presses the pump swashplate 10 against the thrust roller bearing 11 by the force of a plurality of plate springs 38 to always apply the aligning action to the pump swashplate 10.

Also, slidably spline-fitted in the output shaft 25 is a semispherical aligning member 37 in engagement with the inner peripheral surface of the pump swashplate 20 in a manner relatively tiltable in all directions. This aligning member 37 presses the motor swashplate 20 aginst the thrust roller bearing 21 by the force of a plurality of plate springs 39 to always apply the aligning action to the motor swashplate 20.

For strengthening the aligning action of the swashplates 10, 20 and preventing a slip in a rotational direction between the pump swashplate 10 and the group of pump plungers 9, 9 and between the motor swashplate 20 and the group of motor plungers 19, 19, the swashplates 10, 20 are respectively formed with spherical concave portions 10a, 20a in engagement with spherical ends 9a, 19a of the plungers 9, 19. In this case, the spherical concave portions 10a, 20a have the radius of curvature set to be greater than that of the spherical ends 9a, 19a so that a proper engaging state between the concave portions 10a, 20a and the spherical ends 9a, 19a may be secured in any rotational postion of the swashplates 10, 20.

Between the hydraulic pump P and the hydrualic motor M is formed a hydraulic closed circuit as described hereinafter.

In the first valve board 14, an annular low pressure oil passage 41 and an annular high pressure oil passage 40 to encircle the oil passage 41 are provided, and in the first valve board 14, intake valves 43, 43 for allowing a flow of working fluids in one direction from the low pressure oil passage 41 to the cylinder bores 8, 8 of the pump cylinder 7 and a discharge valve 42 for allowing a flow of working fluid in one direction from the cylinders 8, 8 of the pump cylinder 7 to the high pressure oil passage 40 are provided. Accordingly, the number of the intake valves 43 and discharge valves 42 is the same as that of the pump plungers 9, 9.

In the second valve board 15, distribution valves 44, 44 are provided to control alternate communication between the high pressure and low pressure oil passages 40, 41 and the cylinder bores 18, 18 of the motor cylinder 17. Accordingly, the number of the distribution valves 44 is the same as that of the motor plungers 19, 19.

The distribution valves 44, 44, which are of a spool type, are slidably fitted into valve holes 45, 45 radially provided in the second vlave board 15 between the group of cylinder bores 18, 18 and the high and low pressure oil passages 40, 41. The second valve board 15 is further bored with a first and a second ports a, b provided for communication between valve holes 45 and high and low pressure oil passages 40, 41 and a third port c provided for communication between the valve holes 45 and the cylinder bores 18 of the motor cylinder 17 adjacent thereto. With this, when the valve 44 occupies the radial outward position in the valve hole 45, the third port c is placed in communication with the first port a but not in communication with the second port b to place the corresponding cylinder bore 18 in communication with the high pressure oil passage 40. When the valve 44 occupies the radial inward position in the valve hole 45, the third port c is placed in communication with the second port b but not in communication with the first port a to place the corresponding cylinder bore 18 in communication with the low pressure oil passage 41.

Figure 3:
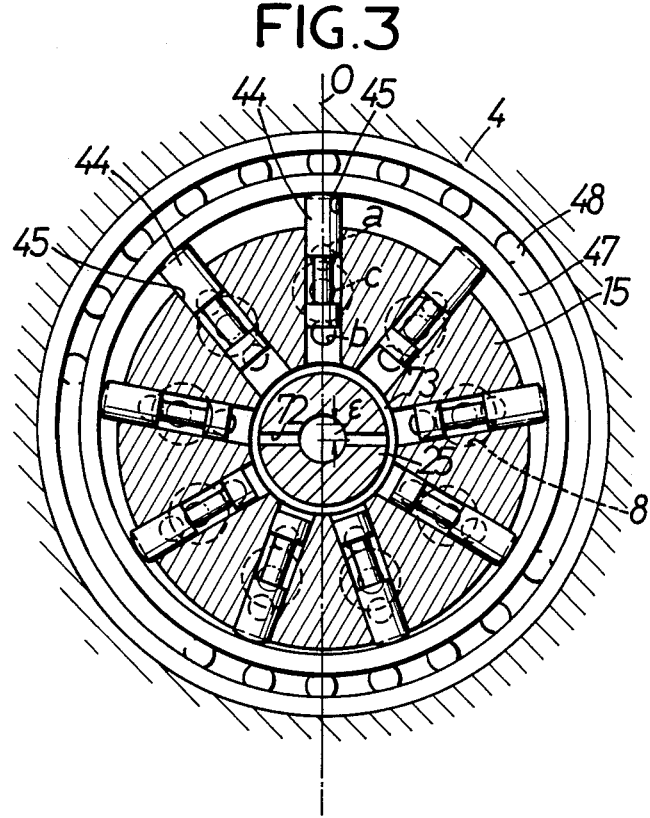
FIG. 3 is a sectional view taken on line III—III of FIG. 1.

As shown in FIGS. 1 and 3, an eccentric ring 47 is disposed encircling the group of distribution valves 44, 44 to control the operation of the valves 44, 44 toward the outward position, and the discharge pressure of a replenishing pump 67 always acts during operation on the inner end surface of each distribution valve 44 so that the outer end of the distribution valve 44 may be brought into engagement with the inner peripheral surface of the eccentric ring 47.

The eccentric ring 47 is formed from an inner race of a ball bearing 48 snapped in the crank case 4, and as shown in FIG. 3, the ring 47 is installed at such a position that the center thereof is to be eccentric a predetermined distance $\epsilon$ from the center of the motor cylinder 17 in a direction of the tilting axis 0 of the motor swashplate 20. Accordingly, when the motor cylinder rotates, each of the distribution valves 44 takes the stroke the distance which is twice of the eccentric amount $\epsilon$ of the eccentric ring 47 within the valve hole 45 and reciprocates between the aforesaid outward position and inward position.

Figure 2:
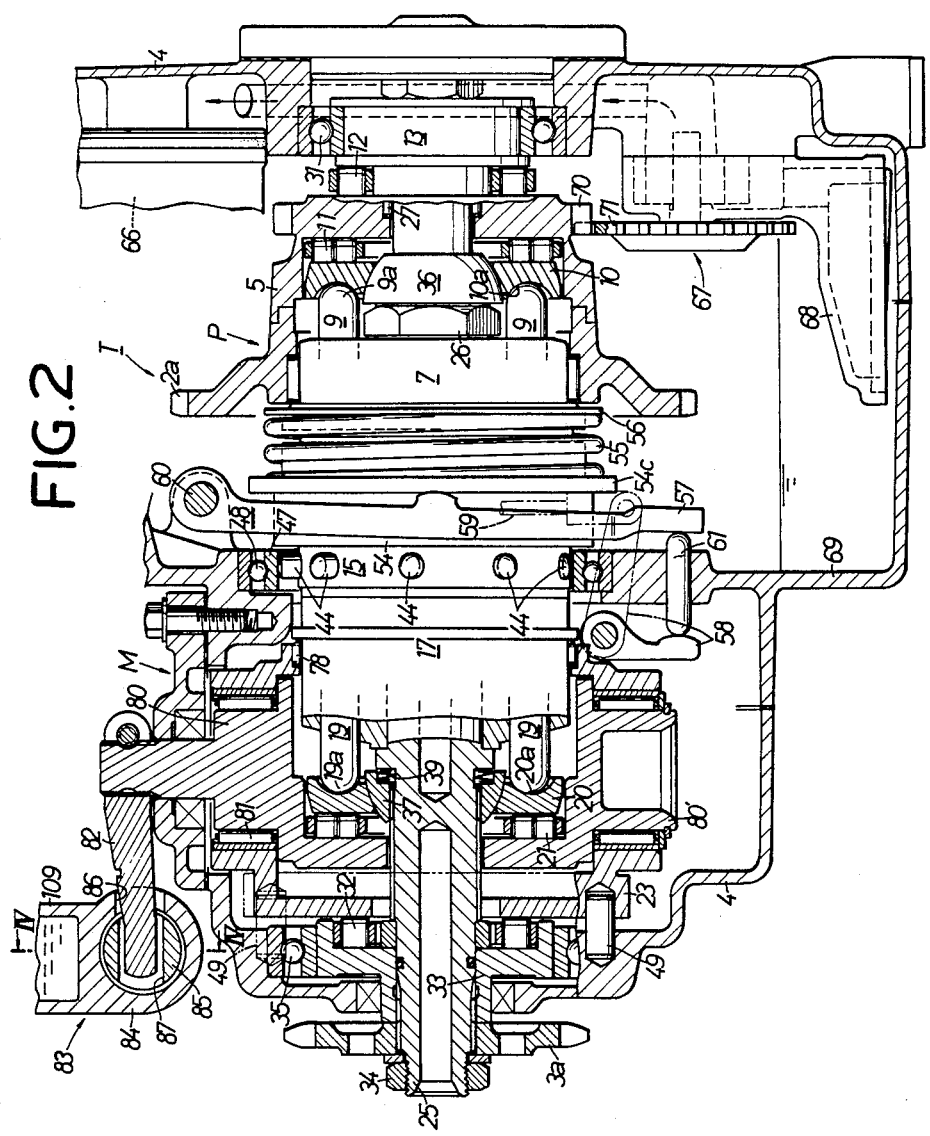
FIG. 2 is a partially longitudinal sectional rear view of the variable transmission.

As shown in FIGS. 1 and 2, a pair of trunnion shafts 80, 80' aligned on the tilting axis 0 of the motor swashplate 20 are integrally provided on both ends of the aforesaid swashplate holder 22, the trunnion shafts 80, 80' being rotatably supported on the swashplate anchor 23 through needle bearings 81. In other words, the tilting axis 0 is defined by the trunnion shafts 80, 80'.

An operating lever 82 is fixedly mounted on the outer end of one trunnion shaft 80. When the trunnion shaft 80 is rotated by the operating lever 82, the swashplate holder 22 integral therewith also rotates and the latter can be tilted even during the rotation of the motor swashplate 20.

The swashplate anchor 23 is supported on the outer periphery of the motor cylinder 17 through needle bearings 78 and is connected to the crank case 4 through a pair of locating pins 49, 49 so that the anchor 23 may not be rotated about the output shaft 25.

With the arrangement as described above, when the input member 5 of the hydraulic pump P is rotated from the primary reduction gear 2, suction and exhaust strokes are alternately imparted by the pump swashplate 10 to the pump plungers 9, 9. Then, each pump plunger 9, in suction stroke, intakes working fluid from the low pressure oil passage 41, and in exhaust stroke, feeds high pressure working fluid to the high pressure oil passage 40.

The high pressure working fluid fed to the high pressure oil passage 40 is supplied to the cylinder bore 18 accommodating the motor plunger 19 in expansion stroke through the distribution valve 44 at the outward position whereas the working fluid within the cylinder bore 18 accommodating the motor plunger 19 in contraction stroke is discharged into the low pressure oil passage 41 through the distribution valve 44 at the inward position.

During this operation, the pump cylinder 7 and motor cylinder 17 are rotated by the sum of reaction torque received by the pump cylinder 7 from the pump swashplate 10 through the pump plungers 9 in exhaust stroke and reaction torque received by the motor cylinder 17 from the motor swashplate 20 through the motor plunger 19 in expansion stroke, which rotary torque is transmitted from the output shaft 25 to the secondary reduction gear 3.

In this case, the speed change ratio of the output shaft 25 with respect to the input member 5 is given by the following equation:

$$\text{Speed change ratio} = 1 + \frac{\text{Capacity of hydraulic motor } M}{\text{Capacity of hydraulic pump } P}$$

Thus if the capacity of the hydraulic motor M is changed from zero to a certain value, the speed change ratio can be changed from 1 to a required value.

Incidentally, since the capacity of the hydraulic motor M is determined by the stroke of the motor plunger 19, the motor swashplate 20 can be tilted from an upright position to an inclined position to thereby steplessly control the ratio from 1 to a certain value.

During the operation of the hydraulic pump P and hydraulic motor M as described above, the pump swashplate 10 and motor swashplate 20 receive the opposite thrust load from the group of pump plungers 9, 9 and the group of motor plungers 19, 19, respectively. The thrust load applied to the pump swashplate 10 is carried by the output shaft 25 through the thrust roller bearing 11, input member 5, thrust roller bearing 12, support sleeve 13 and nut 30, whereas the thrust load applied to the motor swashplate 20 is carried by the output shaft 25 through the thrust roller bearing 21, swashplate holder 22, swashplate anchor 23, thrust roller bearing 32, support sleeve 33, sprocket 3a and nut 34.

Accordingly, the aforesaid thrust load merely causes to produce a tensile stress in the output shaft 25 and does not at all act on the crank case 4 supporting the shaft 25.

Turning again to FIG. 1, on the second valve board 15 are provided one or more clutch valves 50 capable of suitably being communicated between the high and low pressure oil passages 40 and 41. This clutch valve 50 is slidably fitted in a radial valve port 51 which extends from the low pressure oil passage 41 to the high pressure oil passage 40 and opens to the outer peripheral surface of the second valve board 15. The clutch valve 50 is bored with a longitudinal hole 52 opening to the inner end surface thereof and a lateral hole 53 crossing with the longitudinal hole 52 and opening to the outer peripheral surface of the clutch valve 50 whereby when the clutch valve 50 occupies the radial inward position (clutch ON position) in the valve port 51, the laterial hole 53 is closed by the inner wall of the valve port 51 whereas when occupying the radial outward position (clutch OFF position), the lateral hole 53 is opened to the high pressure oil passage 40.

In order that the clutch valve 50 is urged toward the clutch OFF position, the inner end thereof receives oil pressure of the low pressure oil passage 40, and a clutch control ring 54 is slidably provided around the pump cylinder 7 and the outer peripheries of the first and second valve boards 14, 15 and is engaged with the outer end of the clutch valve 50.

The clutch control ring 54 includes a cylindrical inner peripheral surface 54a for defining the clutch ON position of the clutch valve 50 and a tapered surface 54b joined to one end of said inner peripheral surface to define the clutch OFF position of the clutch valve 50, and the ring is urged by means of a spring 55 toward the side wherein the clutch valve 50 is held in the clutch ON position. This spring 55 is compressed between the clutch control ring 54 and a retainer 56 engaged on the outer periphery of the pump cylinder 7.

As shown in FIG. 2, the clutch control ring 54 is connected to a not-shown clutch operating lever through a shift fork 57, an intermediate lever 58 and a clutch wire 59. The shift fork 57 has a base portion journalled at 60 to the crank case 4, an intermediate portion engaged with the side of a flange 54c of the clutch control ring 54, and an extreme end operatively connected to an intermediate lever 58 through a push rod 61.

With this, when the clutch control ring 54 is moved to right as viewed in FIG. 1 against the force of the spring 55 through the shift fork 57 by pulling the clutch wire 59, the tapered surface 54b of the clutch control ring 54 assumes a position opposed to the clutch valve 50. Therefore the clutch valve 50 is moved by the pressure of the high pressure oil passage 40 to the outward position, namely, to the clutch OFF position. As the result, the high pressure oil passage 40 is short-circuited to the low pressure oil passage 41 through the longitudinal hole 52 and lateral hole 53 of the clutch valve 50, and so the pressure of the high pressure oil passage 40 lowers to disable the feed of pressure oil to the hydraulic motor M to make the hydraulic motor M inoperative.

On the other hand, when the clutch control ring 54 is moved to the left by the force of the spring 55 to operate the clutch valve 50 toward the clutch ON position, the lateral hole 53 of the clutch valve 50 is closed by the inner wall of the valve port 51 to cutoff the communication between the high and low pressure oil passages 40, 41. The working fluid is circulated between the hydraulic pump P and the hydraulic motor M through these oil passages 40, 41 in a manner as previously mentioned, and the hydraulic motor M can be returned to its operating condition Since in this case, the operation of the clutch valve 50 to the clutch ON position is effected against the oil pressure of the low pressure oil passage 41 acting on the inner end surface of the clutch valve 50, the resilient force of the spring 55 by which the clutch control ring 54 is moved leftward can be set to be relatively weak, and accordingly, the operating force of the clutch control ring 54 can be relieved.

In an intermediate position between the aforesaid rightward position and leftward position of the clutch control ring 54, an opening degree of the lateral hole 53 of the clutch valve 50 is moderately strained (see FIG. 1B), and the working fluid is circulated between the hydraulic pump P and the hydraulic motor M according to the opening degree thereof. Therefore, the hydraulic motor M can be placed in the half-clutch condition. In this case, since the opening degree of the lateral hole 53 gradually increases and decreases as the clutch valve 50 moves, the half-clutch condition may be easily obtained to provide for the smooth excessive operation.

Turning again FIGS. 1 and 2, the output shaft 25 is bored at the center thereof with an oil passage 63 whose inner part is a dead end, and an oiling pipe 64 supported on the side wall of the crank case 4 is inserted into the open end of the oil passage 63. This oiling pipe 64 is communicated with the interior of an oil pan 69 at the bottom of the crank case 4 through an oil passage 45 formed within the side wall of the crank case 4, a filter 66 mounted on said side wall, a replenishing pump 67 and a strainer 68, the pump 69 being driven by the aforesaid input member 5 through gears 70 and 71. Accordingly, oil within the oil pan 69 is always supplied to the oil passage 63 by the pump 67 during the rotation of the input member 5.

The output shaft 25 further includes one or more first oiling ports 72 which radially extend from the oil passage 63 toward the valve port 45 of the disribution valve 44 and annular grooves 73 for bringing the first oiling port(s) 72 into communication with the group of valve ports 45, 45, whereby when the distribution valve 44 assumes an outward position of the valve hole 45, the second port b joined to the low pressure oil passage 41 comes into communication with the first oiling hole 72 through the valve hole 45. Thus, if the working fluid leaks from the hydraulic closed circuit between the hydraulic pump P and the hydraulic motor M, the working oil is replenished from the first oiling hole 72 into the low pressure oil passage 41 when the distribution valve 44 assumed the outward position of the valve hole 45.

The output shaft 25 is further bored with a second oiling hole 74 radially extending from the oil passage 63 and opening into the cup-like input member 5 and a third oiling hole 75 likewise radially extending from the oil passage 63 and opening into the cup-like swashplate anchor 23, these oiling holes 74 and 75 being provided with orifices 76 and 77, respectively. By the provision of these orifices 76 and 77, a suitable quantity of lubricating oil may be supplied into the input member 5 and swashplate anchor 23 from the oil passage 63 while maintaining the discharge pressure of the replenishing pump 67 in the oil passage 63 to positively supply the working fluid from the first oiling hole 72 to the low pressure oil passage 41.

The oil supplied into the input member 5 lubricates the aligning member 36, pump swashplate 10, pump plungers 9, thrust roller bearing 11, needle bearing 6 and the like, and the oil supplied into the swashplate anchor 22 lubricates the aligning member 37, motor swashplate 20, motor plungers 19, thrust bearing 21 and the like. In this case, since the pump cylinder 7 is fitted in the open end of the cuplike input member 5 through the needle bearing 6, a large quantity of lubricating oil are maintained within the input member 5. On the other hand, since the motor cylinder 17 is fitted in the open end of the swashplate anchor 23 through the needle bearing 78, a large quantity of lubricating oil are maintained also in the swashplate anchor 23.

For further lubricating the sliding surface of the pump plunger 9 and the interior of the input member 5, a small diameter oil hole 112 is bored in the pump plunger 9 to provide a communication of inside and outside thereof, and for further lubricating the sliding surface of the motor plunger 9 and the interior of the swashplate anchor 23, a small diameter oil hole 113 is bored in the motor plunger 19 to provide a communication of inside and outside thereof.

Figure 4:
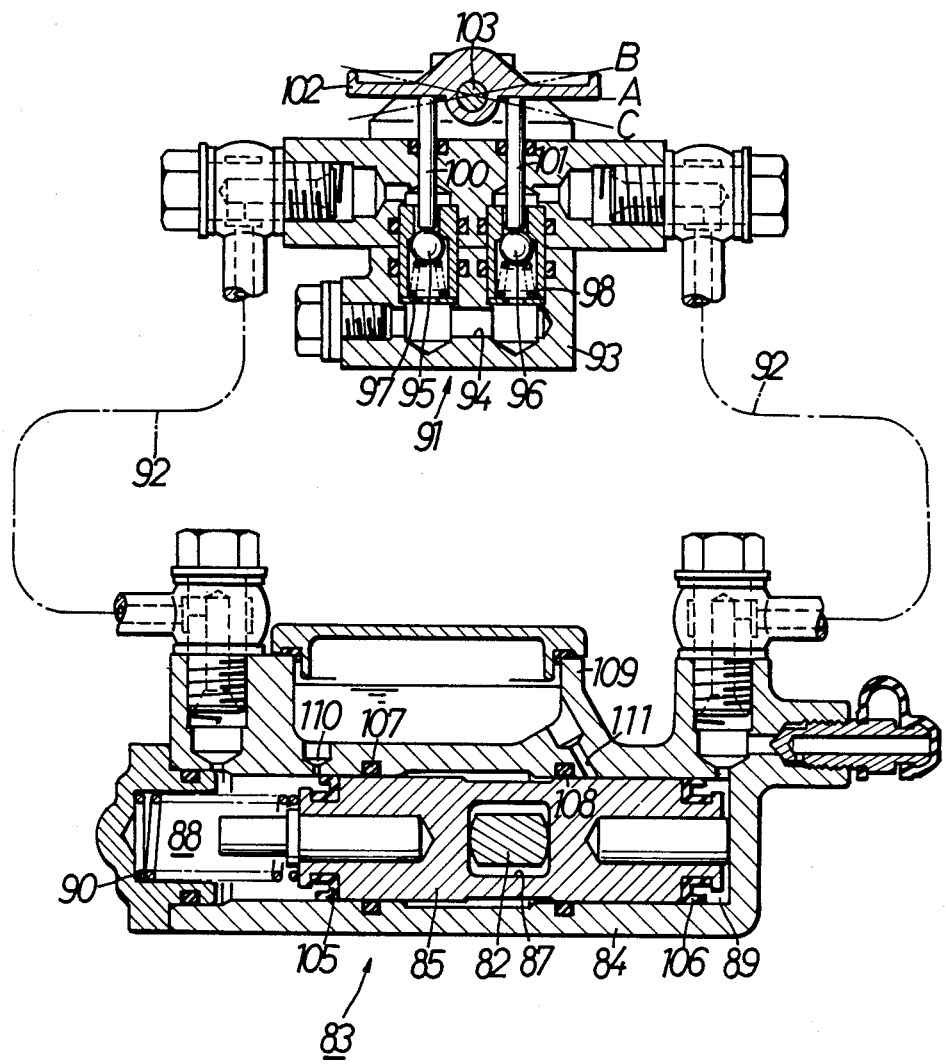
FIG. 4 is a sectional view taken on line IV—IV of FIG. 2.
Figure 5:
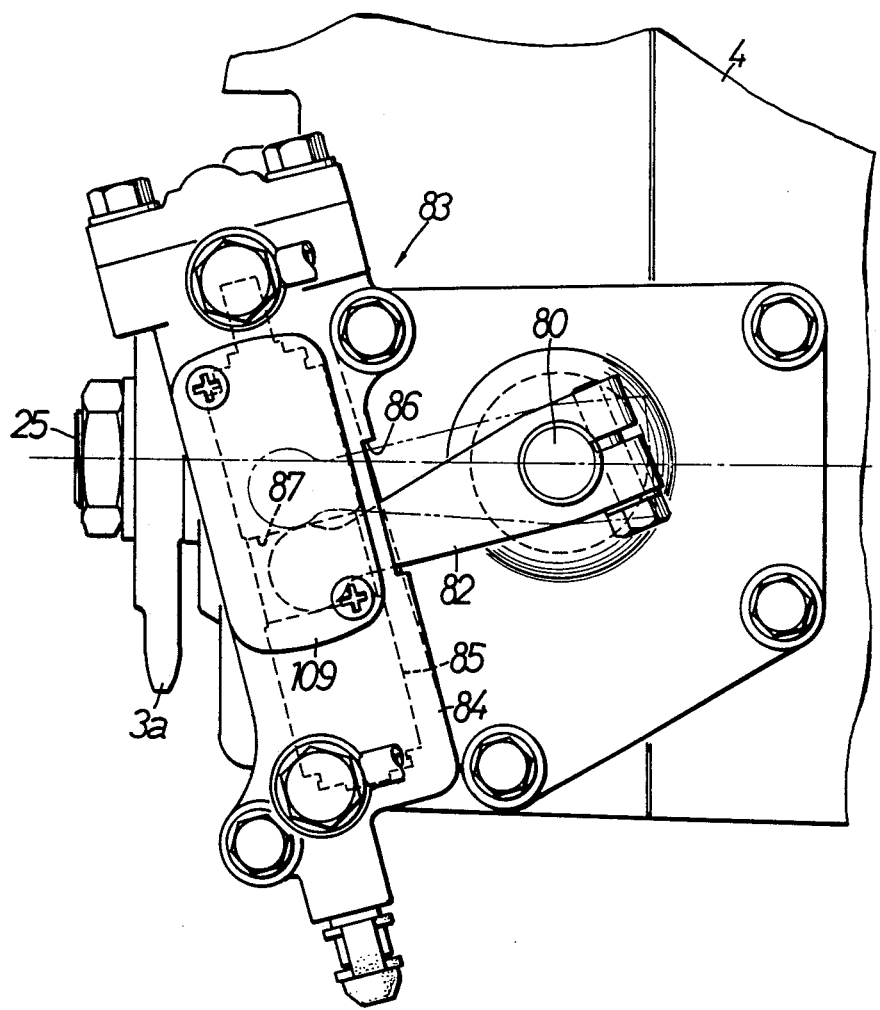
FIG. 5 is a plan view of the continuously variable transmission.

In FIGS. 2, 4 and 5, a speed change control device 83 is connected to an operating lever 82 of the aforesaid trunnion shaft 80 to tiltably operate the motor swashplate 20.

The speed change control device 83 comprises a cylinder 84 secured to the crank case 4 and a piston 85 slidably encased in the cylinder 84. The cylinder 84 has a window 86 bored in the side wall thereof and the piston 85 has a connection hole 87 bored in the central portion thereof, the connection hole 87 extending laterally and fronting on the window 86. The operating lever 82 is engaged with the connection hole 87 passing through the window 86 so that the piston 85 may be slidably moved according to the rotation of the trunnion shaft 80.

In FIG. 4, when the operating lever 82 is actuated, thus when the piston 85 is moved leftward, the motor swashplate 20 assumes its upright state. A first oil chamber 88 and a second oil chamber 89 are defined between the piston 85 and the left end wall of the cylinder 84 and between the piston 85 and the right end wall of the cylinder 84, respectively, and a return spring 90 for urging the piston 85 toward the second oil chamber 89 is compressed in the first oil chamber 88.

The first and second oil chambers 88 and 89 are communicated with each other through a hydraulic conduit 92 with a switching valve device 91 interposed intermediate thereof, in which working fluid is filled.

The switching valve device 91 is composed of a valve casing 93 installed at a suitable location of a vehicle steering device and positioned in the midst of the hydraulic conduit 92, and a first and a second check valves 95, 96 provided in series in an oil passage 94 within the valve casing 93. These first and second check valves 95, 96 are arranged so that the forward directions may be reversed from each other, namely, a flow of oil in a reverse direction from each other, and are always urged in an closed direction by means of valve springs 97, 98, respectively. As shown in FIG. 4, the first and second check valves 95, 96 may be comprised of valve bearings spring biased in a closed position.

Operatively connected to the first and second check valves 95, 96 are a first and a second valve opening rods 100, 101, respectively, capable of forcing the valves in the opening direction. These first and second opening rods 100, 101 are operatively connected to lower surfaces at both left and right ends of a speed change lever 102 of a seesaw type swingingly journalled at 103 on the valve casing 93. With the foregoing, the first and second valve opening rods 100, 101 and the speed change lever 102 constitute a valve opening means according to the present invention.

The speed change lever 102 is operated by an operator to a horizontal hold position A, a leftward swung deceleration position B and a rightward acceleration position C. In the hold position A, the open state of both the check valves 95, 96 is held; in the deceleration position 8, the first opening rod 100 is depressed to forcibly open the first check valve 95; and in the acceleration position C, the second closing valve 101 can be depressed to forcibly open the second check valve 96.

Incidentally, since the number of the motor plungers 19, 19 is odd, the thrust load of the motor plungers 19, 19 on the motor swashplate 20 during the rotation of the motor cylinder 17 is alternately varied in strength one side from the other with the tilting axis 0 of the motor swashplate 20 as a border and the vibratory tilting torque acts on the motor swashplate 20. This vibratory tilting torque acts as a pressing force alterantely to left and right on the piston 85 through the operating lever 82.

With this, when the speed change lever 102 is shifted to the acceleration position C, the first check valve 95 is placed in the open state, and therefore, a flow of oil from the first oil chamber 88 to the second oil chamber 89 is allowed by the second check valve 96 but a flow in a direction reversed thereto is inhibited. Only when the leftward pressing force acts from the operating lever 82 on the piston 85, the oil flows from the first oil chamber 88 to the second oil chamber 89. As the result, the piston 85 moves toward the first oil chamber 88 to turn the operating lever 82 in an upright direction of the motor swashplate 20.

Next, when the speed change lever 102 is shifted to the deceleration position B, the second check valve 96 is then placed in the open state, and therefore, a flow of oil from the second oil chamber 89 to the first oil chamber 88 is allowed by the first check valve 95 but a flow in a direction reversed thereto is inhibited. Only when the rightward pressing force acts from the operating lever 82 to the piston 85, the oil flows from the second oil chamber 89 to the first oil chamber 88. As the result, the piston 85 moves toward the second oil chamber 89 to turn the operating lever 82 in an inclined direction of the motor swashplate 20.

When the speed change lever 102 is returned to the hold position A, both the check valves 95, 96 to be closed cooperate to completely inhibit the flowing of oil within the valve casing 93. Therefore the piston 85 becomes disabled to move, at which position the operating lever 82 can be held to lock the motor swashplate 20 to the upright or inclined position.

When in the stopped state of the transmission T, the speed change lever 102 is shifted to the deceleration position to open the first check valve 95, a flow of oil from the second oil chamber 89 to the first oil chamber 88 becomes enabled, and therefore even if the piston 85 is at the position moved leftward, the piston 85 may be moved to the rightward movement limit by resilient force of the return spring 90 to turn the operating lever 82 to the maximum inclined position of the motor swashplate 20, thus obtaining the maximum speed change ratio to provide for next start.

It is to be noted in this case that if a pivot shaft 103 of the speed change lever 102 is designed to be movable up and down so that both the check valves 95, 96 may be simultaneously forcibly opened by the speed change lever 102, the resistance of the oil passage 94 may be minimized to make rightward movement of the piston 85 by the return spring 90, more smooth.

As shown in FIG. 5, the cylinder 84 is arranged at right angles to the axis of the output shaft 25 or to a position close thereto. In this way, when the operating lever 82 presses the piston 85, it is possible to avoid that the reaction thereof acts on the swashplate anchor 23 in an axial direction of the output shaft 25 through the trunnion shaft 80.

In FIG. 4, a reservoir tank 109 is installed above the cylinder 84, and a relief port 110 and a supply port 111 for bringing the tank 109 into communication with the interior of the cylinder 84 are bored in the upper wall of the cylinder 84.

A first and a second cup seals 105, 106 having a unidirectional sealing function in close contact with the inner peripheral surfaces of the cylinder 84 are mounted on the outer peripheral surfaces of the left end and right end of the piston 85, and O-rings 107, 108 in close contact with the outer peripheral surfaces in the intermediate portion of the piston 85 on both left and right sides of the window 86 are mounted on the inner peripheral surfaces of the cylinder 84.

The relief port 110 opens to the first hydraulic chamber 88 directly before the first cup seal 105 when the piston 85 is positioned at the rightward movement limit, and the supply port 111 always opens to the inner surface of the cylinder 84 between the second cup seal 106 and the O-ring 108.

Accordingly, when the piston 85 is positioned at its rightward movement limit, if a pressure elevation occurs in the first oil chamber 88 due to an increase in oil temperature or the like, said pressure is released from the relief port 110 to the reservoir tank 109. When the piston 85 is moved to the left, the first oil chamber 88 is pressurized by the piston 85 after the first cup seal 105 has passed through the opening of the relief port 110, allowing a flow of oil from the first oil chamber 88 to the second oil chamber 89. At that time, if the second hydraulic chamber 89 is reduced to a level below a predetermined pressure, the oil within the reservoir tank 109 passes from the supply port 111 to a sliding clearance between the cylinder 84 and the piston 85 under the pressure differential between the interior of the reservoir tank 109 and the second oil chamber 89, and the oil is supplied to the second oil chamber 89 while flexing the second cup seal 106 toward the second oil chamber 89.

It is to be noted that if the interior of the reservoir tank 109 is maintained at high pressure, a pretension resulting from oil pressure is applied to the hydraulic conduit 92, and therefore the rigidity of the hydraulic conduit 92 with respect to the change in oil pressure resulting from the operation of the piston 85 can be strengthen to stabilize the operation of the piston 85.

What is claimed is:

1. A switching valve device for a swashplate type hydraulic motor of a variable capacity type in a static hydraulic pressure type continuously variable transmission, comprising:

a first check valve and a second check valve provided in series in an oil passage formed in a valve casing so that the forward directions of the valves are reversed with respect to each other in the oil passage, said check valves being biased in a closed direction by spring means, said check valves being further provided with opening means capable of individually and forcibly opening said valves, a hydraulic motor with an odd-number of motor plungers, a swatchplate holder supporting a motor swashplate of the hydraulic motor tiltably supported on a fixed casing through a trunnion shaft fixedly mounted on said swashplate holder, an extreme end of an operating lever secured to said trunnion shaft operatively connected to a piston fitted in a fixed cylinder so as to be slidable in a turning direction thereof, a first oil chamber and a second oil chamber which are defined between said cylinder and said piston and opposed to each other with said piston sandwiched therebetween being mutually communicated through a hydraulic conduit filled with working fluid, said switching valve device being interposed in said hydraulic conduit so that oil pressure within said first and second oil chambers is controlled to be increased and decreased by switching operation of said switching valve device to slidably move and stop said piston to adjust an angle of inclination of said motor swashplate, said cylinder encasing therein a return spring for biasing said piston toward said second oil chamber.

2. An apparatus for adjusting the position of a swashplate in a swashplate type hydraulic pressure device, comprising:

a cylinder, an odd-number of plungers slidable in bores, said bores disposed in said cylinder annularly around the axis of said cylinder, a tiltable swashplate placed in abutment against projected ends of said plungers and held in a swashplate holder which is tiltably supported on a stationary casing via a trunnion shaft, the trunnion shaft having an integral operation lever which is rotatable in a tilting direction of the swashplate and which is fixed with a piston slidably fitted in a cylinder member, said piston defining a pair of first and second oil chambers on opposite sides thereof within said cylinder member, said chambers communicating with each other through a hydraulic conduit which is sealingly filled therein with working fluid, and a switching valve device which is interposed in said hydraulic conduit and comprises a valve casing with an oil passage therein, a first check valve and a second check valve disposed in series in said oil passage with forward directions thereof being set reverse to each other, spring means urging said first and second check valves in respective closing directions and opening means adapted for individually and forcibly opening said valves, whereby pulsations in intensity of a thrust load caused by said odd-number of plungers abutting against the swashplate between opposite sides of a tilting axis of the plate are utilized to adjust and change an angle of tilt of the swashplate by causing a flow of the fluid in said hydraulic conduit between the first and second oil chambers, which flow is controlled through operation of the switching valve device.

3. The apparatus according to claim 2, wherein said opening means further comprises means to open both first and second check valves together and to hold said first and second check valves in said open condition.

4. The apparatus according to claim 2 or 3, wherein said hydraulic pressure device is a variable capacity type motor.

5. The apparatus according to claim 4, wherein said hydraulic pressure device is part of a static hydraulic pressure type continuously variable transmission.

6. The apparatus according to claim 2, wherein said hydraulic pressure device is part of a static hydraulic pressure type continuously variable transmission.

* * * * *